United States Patent
Taskaya et al.

(10) Patent No.: US 8,522,016 B2
(45) Date of Patent: Aug. 27, 2013

(54) ON-THE-FLY DATA MASKING

(75) Inventors: Ilker Taskaya, Natick, MA (US); Alex Nauda, Melrose, MA (US)

(73) Assignee: Axis Technology Software, LLC, Boston, MA (US)

( * ) Notice: Subject to any disclaimer, the term of this patent is extended or adjusted under 35 U.S.C. 154(b) by 375 days.

(21) Appl. No.: 12/818,808

(22) Filed: Jun. 18, 2010

(65) Prior Publication Data

US 2011/0314278 A1    Dec. 22, 2011

(51) Int. Cl.
*H04L 29/06* (2006.01)
*G06F 12/14* (2006.01)

(52) U.S. Cl.
USPC ............................................. 713/167; 726/27

(58) Field of Classification Search
None
See application file for complete search history.

(56) References Cited

U.S. PATENT DOCUMENTS

| | | | |
|---|---|---|---|
| 5,479,513 A * | 12/1995 | Protopopescu et al. | 380/28 |
| 5,999,622 A * | 12/1999 | Yasukawa et al. | 705/51 |
| 6,834,341 B1 * | 12/2004 | Bahl et al. | 713/156 |
| 8,095,993 B2 * | 1/2012 | Shu et al. | 726/34 |
| 2002/0138465 A1 * | 9/2002 | Lee | 707/1 |
| 2005/0259814 A1 * | 11/2005 | Gebotys | 380/28 |
| 2007/0110224 A1 * | 5/2007 | Gumpel et al. | 380/28 |
| 2009/0049511 A1 * | 2/2009 | Manickam et al. | 726/1 |
| 2009/0100527 A1 * | 4/2009 | Booth et al. | 726/27 |

* cited by examiner

*Primary Examiner* — William Powers
(74) *Attorney, Agent, or Firm* — Proskauer Rose LLP

(57) ABSTRACT

Described are methods, systems, and apparatus, including computer program products for securing data of a production server. The invention, in one implementation, includes reading a data value on the production server, obfuscating the data value in the memory of the server to create a masked value, transmitting the masked value to a non-production server, and storing the masked value on the non-production server.

18 Claims, 8 Drawing Sheets

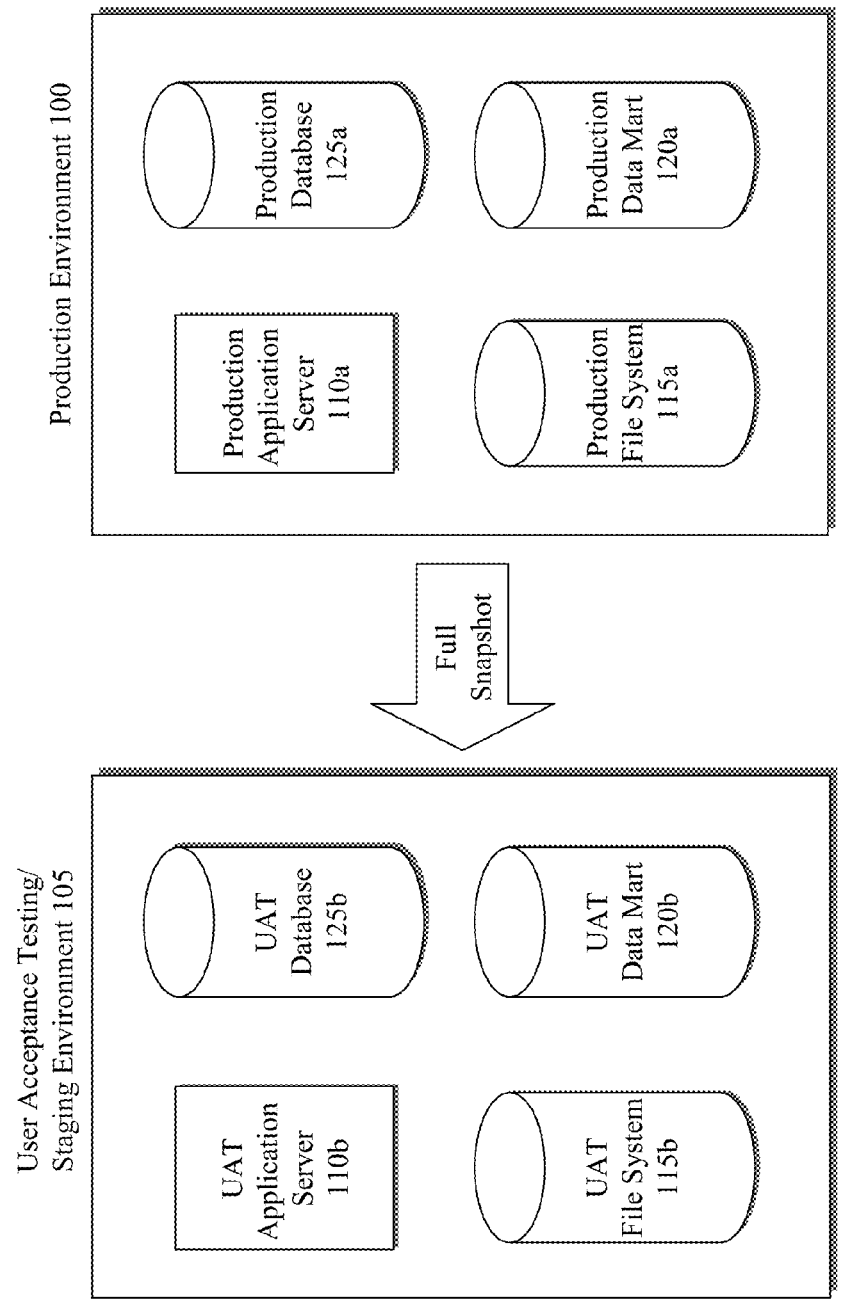

ON-THE-FLY DATA MASKING

FIELD OF THE INVENTION

The present invention relates generally to migrating data from a production environment to a non-production environment and, more specifically, to obfuscating live data to protect the privacy of individuals that use the system.

BACKGROUND

Many industries are required to keep their users' data private. Banks and healthcare providers—to name just a few—face embarrassment, decreased customer confidence, not to mention lawsuits, if they inadvertently release customer or patient data. Furthermore, many governments are passing legislation that requires the protection of personal data, e.g., "Mass 201" which sets out guidelines and obligations for anyone that receives personal information from residents of Massachusetts. But the very systems that house this data need to be tested before deployment using data sets and test cases that come as close as possible to real-world conditions. But migrating real world data to testing and development environments—where dozens or hundreds of employees may access the environment—can lead to the very privacy leaks that companies fear.

SUMMARY OF THE INVENTION

The present invention provides means—in various embodiments—for securing data from a production environment before it is transmitted to a non-production environment.

In one aspect, there is a method for securing data of the production server that is executed on a computer processor. The method includes reading a data value on the production server and obfuscating the data value in the memory of the server to create a masked value. Then the masked value is transmitted to a non-production server, and stored on the non-production server.

In another aspect, there is a computer program product, tangibly embodied in a computer-readable storage medium, for securing data of a production server. The computer program product is typically software, but may be a combination of hardware and software or even a specific hardware implementation of the software. The computer program product includes instructions operable to cause a data processing apparatus, such as a computer, to read a data value on the production server and obfuscate the data value in the memory of the server to create a masked value. The masked value is then transmitted to a non-production server and stored on the non-production server.

In another aspect, there is a system for securing data. The system includes a target non-production server and a production server. The production server is configured to read a data value on the production server, obfuscate the data value in the memory of the server to create a masked value, transmit the masked value to the non-production server, and cause the masked value to be stored on the non-production server.

Any of the above aspects—the method, computer program product, or system—may enjoy one or more of the following benefits. In some implementations, the obfuscating step involves masking the data value using a segmented mapping technique. Alternatively or additionally, the obfuscating step includes masking the data value using a secure lookup technique with the lookup table being stored on the non-production server. And in some implementations, the user is presented with a plurality of obfuscation techniques and the user can select which obfuscation technique to apply. Advantageously, a report can be generated for the obfuscation procedure. Also, the status of the obfuscation can be emailed to a user.

In another aspect, there is a method, executed on a computer processor, for secure data transformation and lookup. The secure lookup begins by encrypting a data value to create an encrypted value. A hash value is then generated based on the encrypted value and a modulo operation is performed on the hash value to create a modulo value. A transformed value is then retrieved from a lookup table by using the modulo value as an index for the look up table.

There is also a system for secure data transformation and lookup. The system includes a look up table with transformed values, each value with a corresponding index, and there is a processor. The processor is configured to receive a data value to be transformed, encrypt the data value to create an encrypted value, generate a hash value based on the encrypted value and perform a modulo operation on the hash value to create a modulo value. Finally, the processor retrieves, from the lookup table, a transformed value, using the modulo value as the index.

There is also a computer program product, tangibly embodied in a computer-readable storage medium, for secure data transformation and lookup. The computer program product is typically software, but may be a combination of hardware and software or even a specific hardware implementation of the software. The computer program product includes instructions operable to cause a data processing apparatus, such as a computer, to encrypt a data value to create an encrypted value. A hash value is then generated based on the encrypted value and the data processing apparatus then performs a modulo operation on the hash value to create a modulo value. Finally, the data processing apparatus retrieves a transformed value from a lookup table by using the modulo value as an index for the look up table.

In another aspect there is a method, executed on a computer processor, for masking data. The method involves receiving a mapping scheme with a number of segments and receiving a different cryptographic algorithm for each segment. A target value to be masked is also received and then split into a number of segments based on the number of segments of the mapping scheme. A cryptographic algorithm is then applied to each segment of the target value for each segment in the mapping scheme to generate an encrypted segment for each segment in the target value. Lastly, the encrypted segments are concatenated to create a masked value. There is also a computer program product with instructions operable to cause a data processing apparatus to perform the steps of the method.

The cryptographic algorithm in the method and computer program product typically takes one of two forms. One option is to start by creating a table with rows of mask values. The number of rows of the table corresponds to the length of each segment, e.g., if there are two digits in the segment, there are 10 rows in the table, i.e., 0 through 9. Then a random number is created for each row in the table. The rows are sorted based on the random number associated with each row, and a lookup function is performed using the segment value as an index for the table to retrieve a mask value of a particular row.

The other option is similar, but slightly different. In it, a first table is created with all possible values for a variable of length equal to the length of the current segment (same as above, all value 0-9 for a two digit segment). Then, a second table is created with rows of mask values. Similar to the first table, the number of rows of the second table corresponds to the length of each segment. Then a random number is created for each row in the second table and the rows of the second table are sorted based on the random number associated with each row. Then, the first table and the second table are joined such that each possible value is paired with a mask value and a lookup function is performed using the segment value as an index for the table to retrieve a mask value of a particular row.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings, in which:

FIG. 1A depicts an architecture in which the present invention operates;

DETAILED DESCRIPTION

FIG. 1A depicts an architecture that the present invention operates in. There are typically two environments, "production" 100 and "user acceptance testing" 105 or "UAT." The production environment 100 is the live data in which an external website user interacts. The UAT environment 105 is a testing ground for new code and bug fixes so that any changes can be vetted before they are pushed to the live system. If changes are not tested before being deployed to the production environment 100, users' service may be interrupted if the code causes a malfunction, or worse, the changes allow unauthorized access to the data that drives the website. Therefore it is important that UAT 105 match the production environment 100 as closely as possible. It is not uncommon, in some embodiments, for UAT 105 to execute the exact same software and on a computer that is a duplicate of the production environment 100.

Figure 1B:
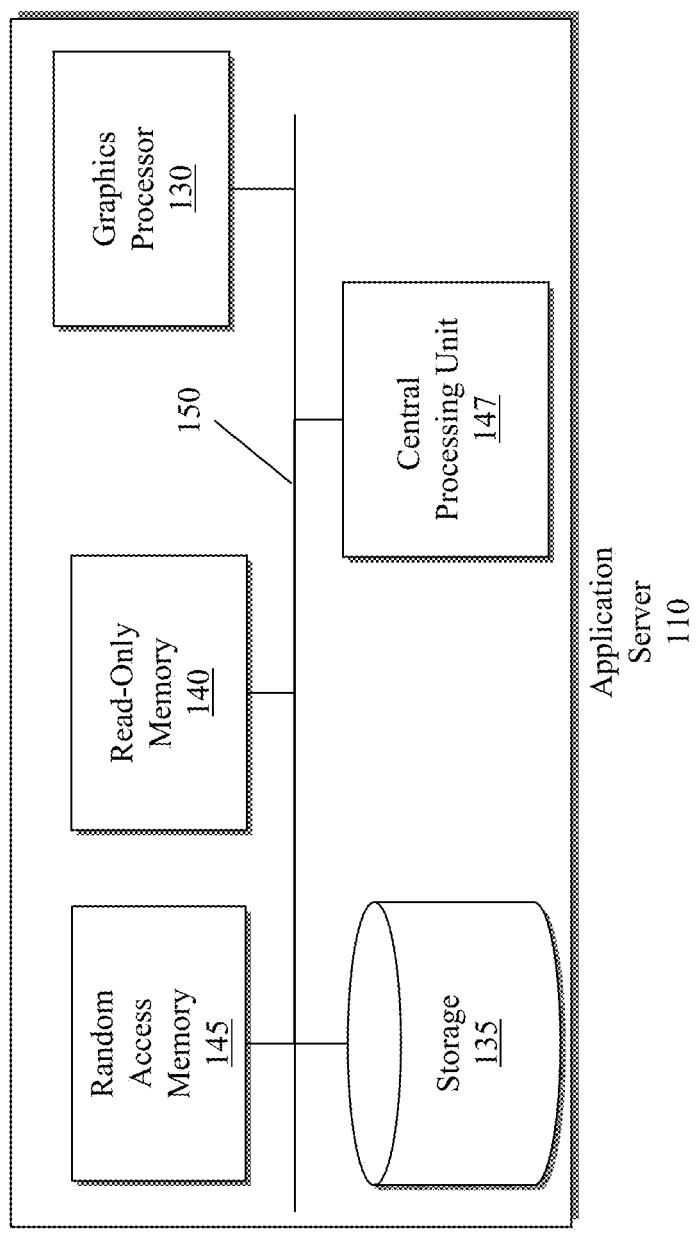
FIG. 1B shows the components of a typical server upon which the present invention operates.

A typical environment, whether production or UAT, often has an Application Server 110a, 110b, a file system 115a, 115b that is accessed by the application server 110, a Data Mart 120a, 120b, and a Database 125a, 125b for storing user information. The computers that serve as the Application Servers 110a, 110b (collectively 110) typically include several components, as shown in FIG. 1B. An Application Server 110 typically includes a graphics processor 130, storage component 135, such as a hard drive, Read Only Memory (ROM) 140, Random Access Memory (RAM) 145, and a Central Processing Unit (CPU) 147, all in signal communication via a bus 150. The bus 150 also connects to a network input/out for communication with networked storage and databases, e.g., the Database 125 associated with the respective environments.

In some embodiments, execution of the software used for masking limits the Application Server 110a it is operating on to a particular purpose, e.g., masking the data as it moves from production to user acceptance testing. In these scenarios, the Application Server 110a combined with the software, in effect, becomes a particular machine while the software is executing. In some embodiments, though other tasks may be performed while the software is running, execution of the software still limits the computer and may negatively impact performance of the other tasks. In some embodiments, while the software is executing, the computer directs output related to the execution of the software to the display, thereby controlling the operation of the display. The Application Server 110a can also receive inputs provided by one or more users, perform operations and calculations on those inputs, and direct the display to depict a representation of the inputs received and other data such as results from the operations and calculations, thereby transforming the input received from the Production Database 125a into another form such as a masked value. Beneficially, a visual representation of the masked value can be displayed on the display.

Referring back to FIG. 1A, generally the information and configuration of the production environment 100 is captured via a full snapshot and imported into the UAT environment 105. Personal data, however, cannot just be wholesale copied from a live system 100 to a test system 105 due to the privacy concerns raised earlier. In the present invention, the personal data from the production environment 100 is masked on-the-fly as it is copied to the UAT environment 105, substituting masked values on the UAT environment for the source value on the production environment. In one embodiment, the invention, coded in Java programming language, uses connectors to access data stores, e.g., Oracle, SQL Server, DB2 and other databases, as well as data integration products such as Ab Initio, Informatica, DataStage and others.

Data can also be masked on-the-fly to other development environments such as Quality Assurance environments and Development environments. Advantageously, only certain tables can be masked or only certain views into the data need to be masked. This can be selected by a system administrator or based on a company's security policy.

One implementation of the invention uses a secure lookup to obfuscate the production data. Secure lookup begins by encrypting the production data to be transformed to create an encrypted value. In a preferred embodiment, Advanced Encryption Standard ("AES") is used for encryption, but other encryption schemes such as Triple DES, Blowfish, etc. are also usable.

After encrypting the data, a hash value is generated based on the encrypted value. Typical hash values are created using the MD5 algorithm. After creating the hash value, a modulo operation, e.g., modulo one hundred (100), is performed on the hash value to create a modulo value. The modulo value is then used as an index for a lookup table—which contains a series of safe values—and the safe value is retrieved from the lookup table. The look up table may be pre-populated with valid values, or the user may select the safe values, e.g., famous actors for names, famous addresses for addresses, etc. The safe value is retrieved and used in place of the production value and used as the masked value.

Figure 2:
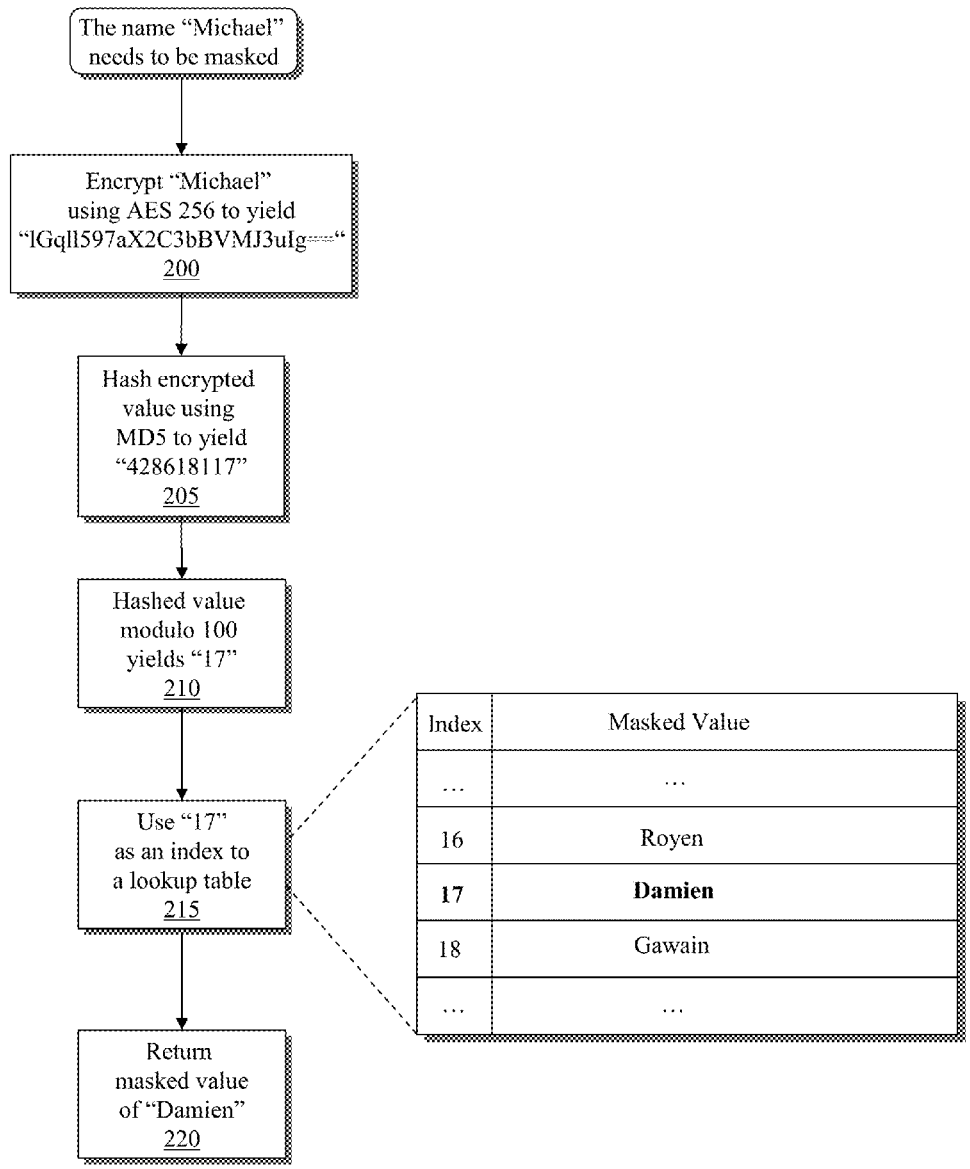
FIG. 2 shows an example of secure lookup.

FIG. 2 shows an example of secure lookup. In FIG. 2, the name "Michael" can be masked to "Damien" by the processor 147 of the Production Application Server 110a. The process begins by encrypting (step 200) "Michael" using AES 256. The output of the AES encryption is "1Gq11597aX2C3bBVMJ3uIg==". That value is then hashed (step 205) using MD5 and becomes "428618117". The hash value is modded (step 210), e.g., by mod 100, to yield "17". That value is then used (step 215) as the index to a name table and the 17th entry is "Damien". The value of "Damien" is returned (step 220) as the masked value. Now, no one reading the non-production data of "Damien" will know the original value on the production server is "Michael."

Beneficially, the process is irreversible, so the end value cannot be used to recreate the original value. Also, in some implementations, a user of the system can populate the lookup table with their own values, e.g., fictional characters, famous people from world history, and others. Keys for encryption can also be rotated to provide additional security so that a value that is masked one day, after key rotation, would yield a different masked value another day. Similar rotation of hashing algorithms or modulo operations are also possible.

In some embodiments, mask values are created using a technique called "segmented mapping". In segmented mapping, a mapping scheme is used that has a number of segments with each segment associated with a different cryptographic algorithm. Then, the target value to be masked is split into a number of segments based on the number of segments of the mapping scheme. The cryptographic algorithm for each segment in the mapping scheme is then used to encrypt each segment of the target value to generate an encrypted segment for each segment in the target value. Then the encrypted segments are all concatenated together to create a masked value.

In some implementations of the segmented mapping approach, the cryptographic algorithm for a segment involves creating a table with rows of mask values, with the number of rows of the table corresponding to the length of each segment. Then a random number is created for each row in the table. The rows of the table are then sorted based on the random number associated with each row and a lookup function is performed using the segment value as an index for the table to retrieve a mask value of a particular row.

Figure 3A:
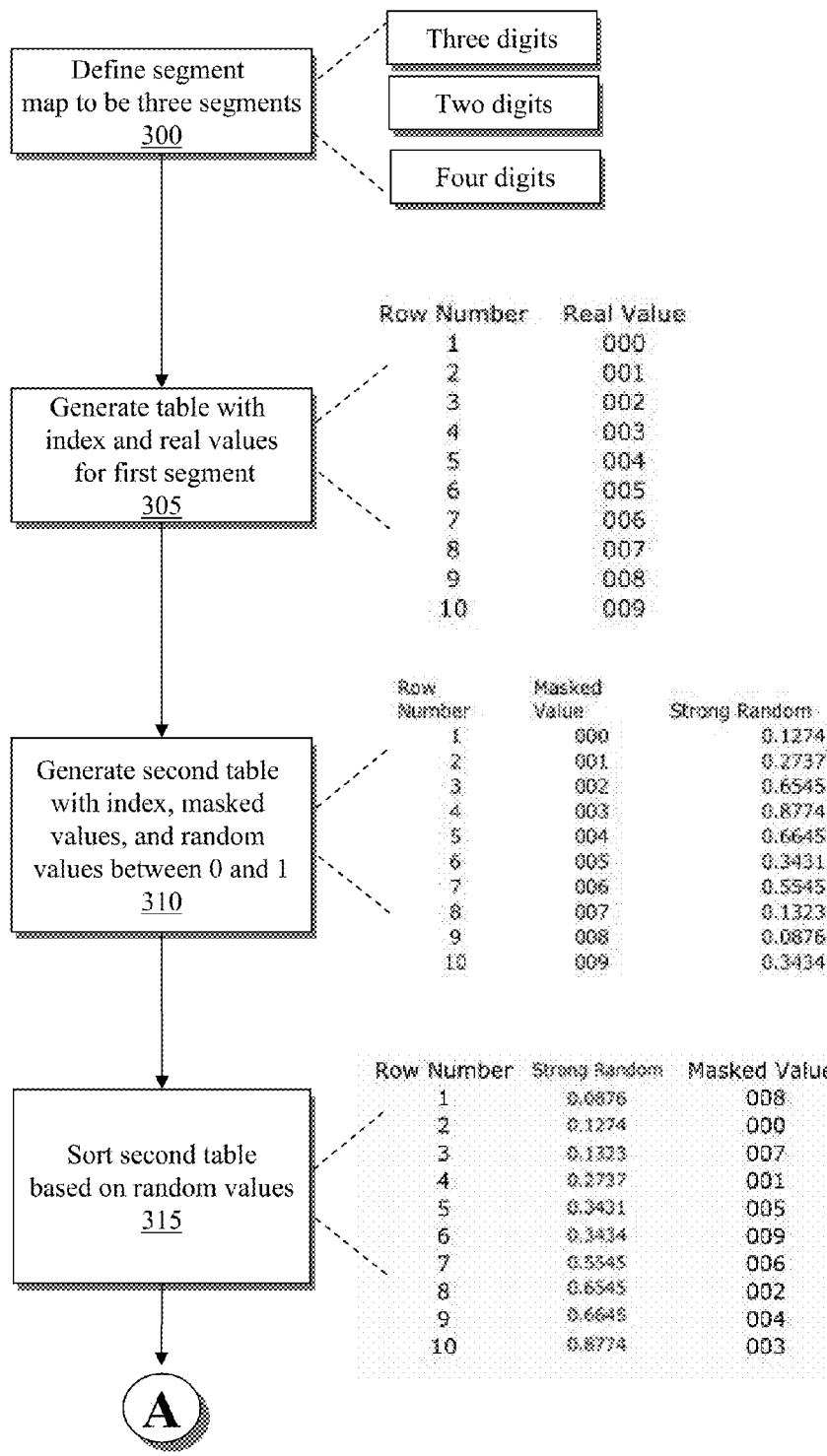
FIGS. 3A and 3B show an example of how a real value can be masked to a target value.
Figure 3B:
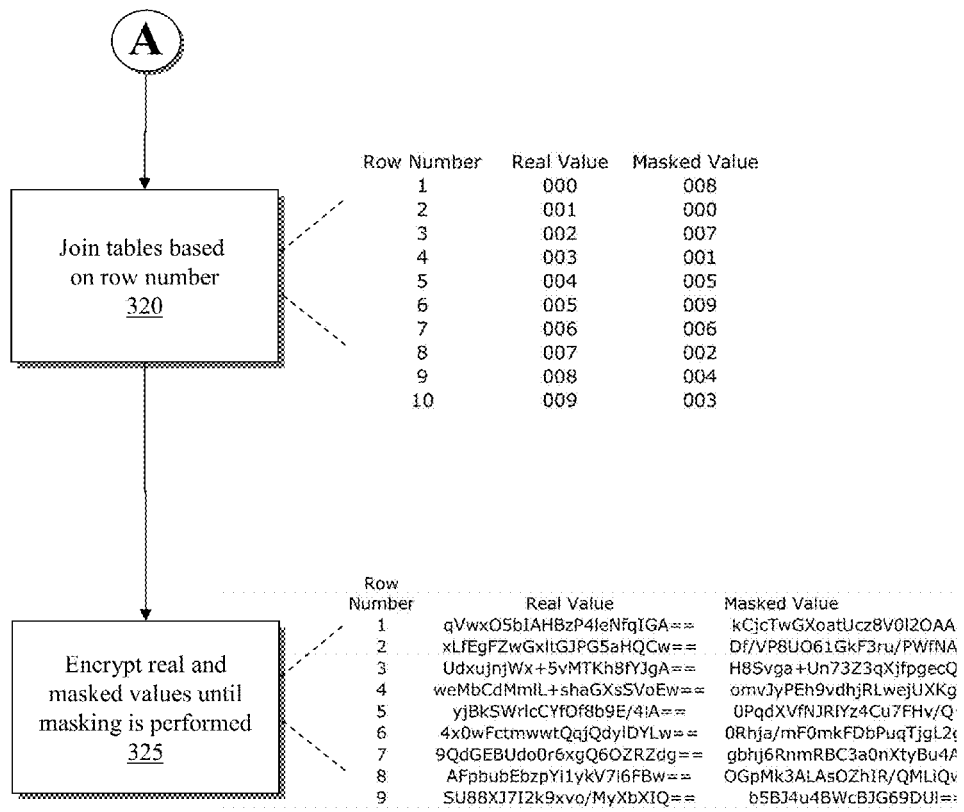

FIGS. 3A and 3B show an example of how "AA3588456000" becomes "AA2458456123." First, a segment map is defined 300 as being a segment map of three segments, with the following lengths: the first segment is three digits long, the second is two digits long, and the third is four digits long. The total map size in this example is based on the digits portion of the value to be masked, and the breaks can be decided by the system administrator, or they can be programmatically chosen by the invention by splitting the length of the value to be masked at random points. In this example, the first two letters ("AA") are kept and will not be transformed. It is understood though that alphanumeric characters can also be mapped, and the segments can be of any size.

The processor generates 305 the first segment with real values from 000 to 999 (the table will have rows numbered to 998). Then the processor generates another table 310 with masked values from 000 to 999, and each row is assigned a random number between 0 and 1, generated using a strong random number generator. Beneficially, a cryptographic alphanumeric string is also usable, generated using an encryption algorithm, e.g., AES 256.

The second table is then sorted 315. In a preferred embodiment, the sorting occurs in an ascending manner based on the strong random number, from lowest to highest. This will cause the masked values to no longer be in order, e.g., the mask value of 000 will no longer be in the first row, the masked value of 008 will be (because its strong random number is 0.0876, which is less than masked value 000's strong random number of 0.1274). The table can also be sorted in a descending manner.

Referring to FIG. 3B, the second table and the first table are then joined 320 on row number to create a real and masked value pair. As shown in FIG. 3B, real value 000 is joined with masked value 008. Real number 001 is joined with masked value 000. Real number 002 is joined with masked value 007, and so forth. Alternatively, the real value and masked value do not need to be paired, but rather the real value serves as an index for performing a lookup function to retrieve a mask value of a particular row.

Then, the real and the masked values are encrypted 325. As before, the encryption can be performed using any strong cipher, e.g., AES 256. This is then repeated for each segment that is to be masked, which allows a real value to have different mask values depending on which segment it is in.

When the masking operation is called for, the real and masked values are then decrypted and any real values in the database to be masked are substituted in the target storage using the masked value instead. Because the user can specify the segmenting of the value and which values will be preserved, i.e., left unmasked, and which will not, this allows a user to generate their own segmented mappings to mask with unique values consistently, and define values which need to be preserved, such as dashes, or semantically rich values.

Figure 4:
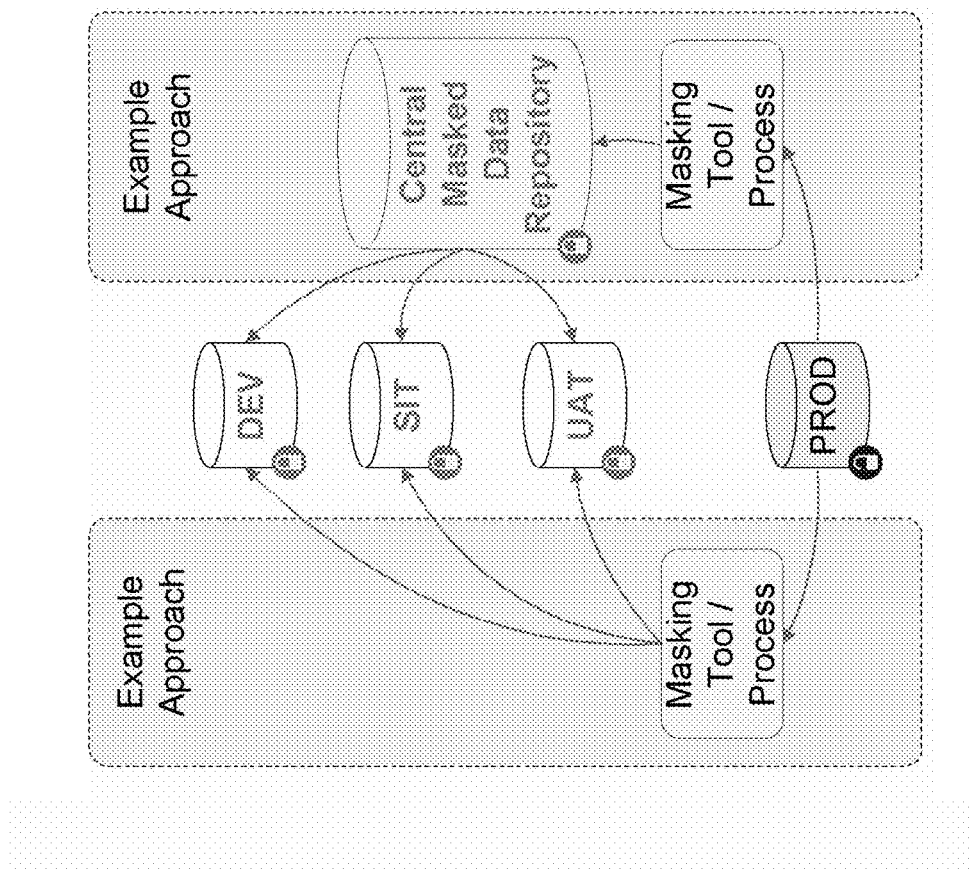
FIG. 4 shows two potential use cases of the invention.

FIG. 4 shows two potential use cases of the invention. In FIG. 4, a data value is read from the PROD database by the application server (110a of FIG. 1A). The data value is obfuscated in the memory of the application server using one of the techniques described above to create a masked value. The masked value is then transmitted to the non-production server (UAT, SIT, and DEV) databases. Then the masked value is stored in the non-production server databases. Alternatively, the PROD database is masked into a central repository that UAT, SIT, and DEV all can read from. In either case, the data masking process can occur on the production application server 110 or a masking server may be used that does not store the masked values in a permanent storage, and in both cases the UAT, SIT, and DEV servers are never able to access the real data on the PROD database. When masking data, advantageously the techniques described herein do not involve analyzing relationships between data or reading a database catalog. Instead, analysis is isolated to the field itself and therefore can operate over distributed systems, where relationship information may not be available.

Figure 5:
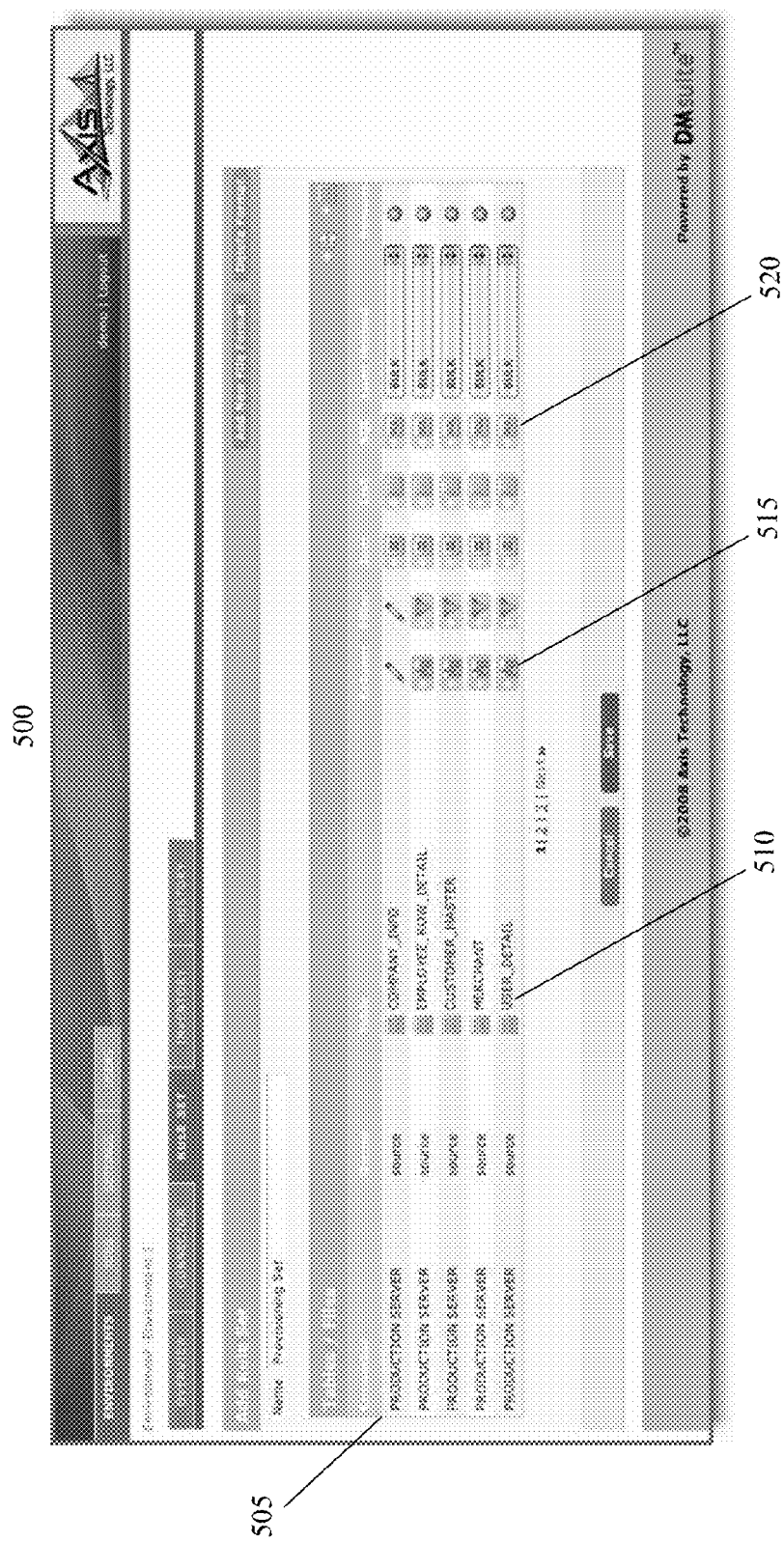
FIG. 5 shows a screen shot of a web interface to the masking tool.

FIG. 5 shows a screen shot 500 of a web interface to the masking tool. The web interface may reside on the Application Server 110 or it may be on a separate server that accesses the masking tool executing on the Application Server 110. Each masking operation has a connector 505 which indicates where the source data is coming from (and hence, where the masking tool needs to connect to). The interface also specifies what tables 510 will be masked, and gives the option for further specifying only certain columns 515. In the embodiment pictured, the user may also input 520 specific Structured Query Language (SQL) commands to retrieve data for masking. These masking operations are then used for masking jobs that can be scheduled.

Figure 6:
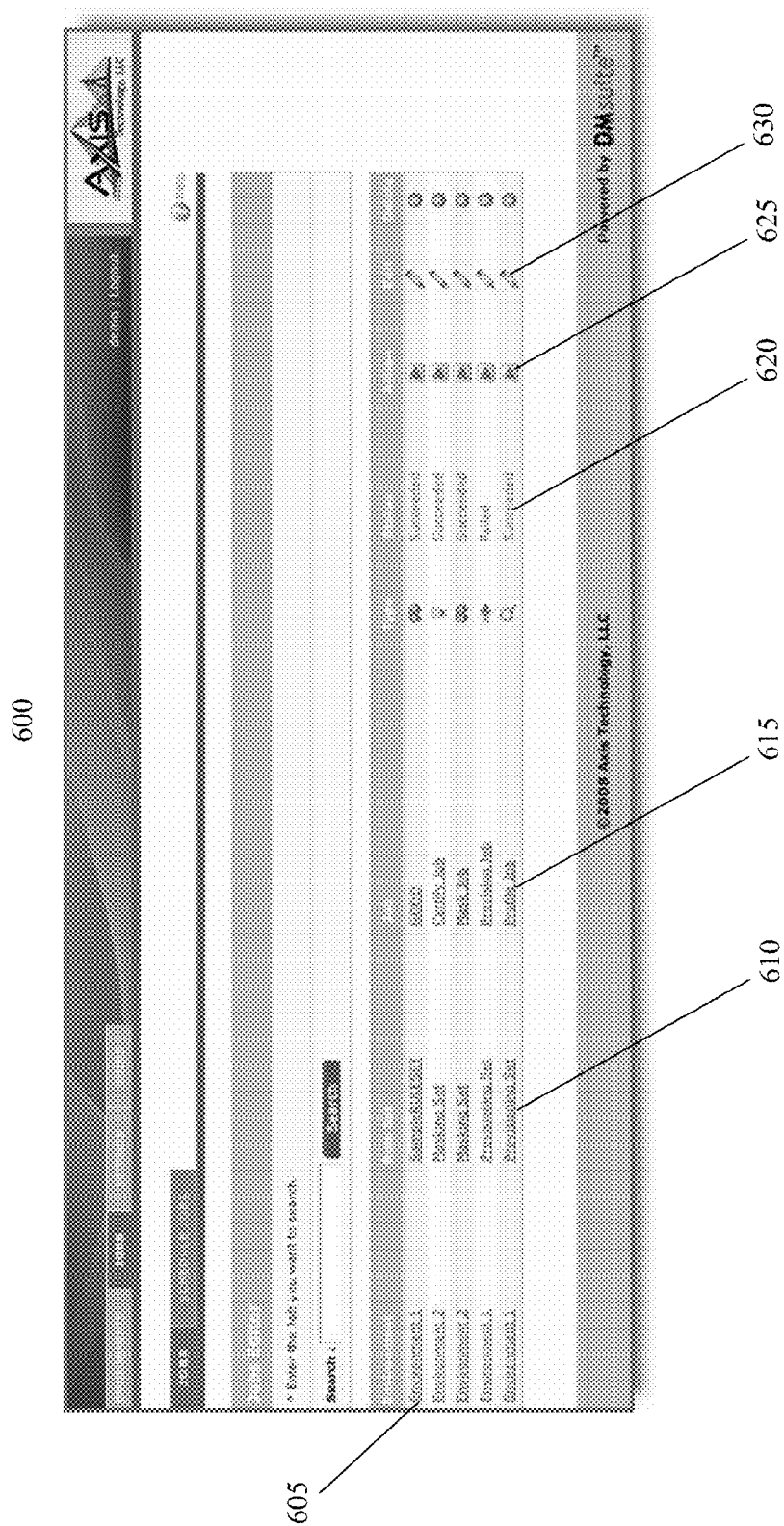
FIG. 6 shows a report of scheduled masking jobs.

FIG. 6 shows a report 600 of scheduled masking jobs. The jobs specify an environment 605 they were executed in, e.g., Production, UAT, etc, but here listed as "Environment 1" and "Environment 2." The report also shows the rule set 610 used to mask the data, what type of job 615 the job was, e.g., mask job, provision job, etc., and a job status 620, i.e., whether the job succeeded or failed. The user may also take an action 625 on the job such as re-running it or the user may edit 630 a job to modify it or to fix it if the job failed. When editing, the user may alter the rule set 610, or the environment 605, or any other parameter. Beneficially, the report can be emailed—using techniques known to those in the art—to a user, system administrator, masking consultant, or the like either automatically or upon request by that person.

The above-described techniques can be implemented in digital electronic circuitry, or in computer hardware, firmware, software, or in combinations of them. The implementation can be as a computer program product, i.e., a computer program tangibly embodied in an computer-readable storage medium, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system and the components of the system can be interconnected by any form or medium of digital data communication, e.g., a communication network. Examples of communication networks include a local area network ("LAN") and a wide area network ("WAN"), e.g., the Internet, and include both wired and wireless networks.

The invention has been described in terms of particular embodiments. The alternatives described herein are examples for illustration only and not to limit the alternatives in any way. The steps of the invention can be performed in a different order and still achieve desirable results. Other embodiments are within the scope of the following claims.

What is claimed is:

1. A method, executed on a computer processor of a production server, for securing data of the production server comprising:
   reading a data value on the production server;
   obfuscating the data value in the memory of the production server by generating via a non-reversible process an index into a secure lookup table based on the data value and retrieving a secure lookup table value at the index in the secure lookup table to create a masked value;
   transmitting the masked value to a non-production server; and
   storing the masked value on the non-production server.

2. The method of claim 1, wherein the obfuscating step comprises masking the data value using a segmented mapping technique.

3. The method of claim 1, wherein the secure lookup table is stored on the non-production server.

4. The method of claim 1, further comprising generating a report of the obfuscation step.

5. The method of claim 1, further comprising emailing a user the status of the obfuscating step.

6. The method of claim 1, further comprising presenting a plurality of obfuscation techniques to the user and basing the obfuscating step on a selection made by the user.

7. A computer program product, tangibly embodied in a non-transitory computer-readable storage medium, for securing data of a production server, the computer program product comprising instructions operable to cause a data processing apparatus to:
   read a data value on the production server;
   obfuscate the data value in the memory of the production server by generating via a non-reversible process an index into a secure lookup table based on the data value and retrieving a secure lookup table value at the index in the secure lookup table to create a masked value;
   transmit the masked value to a non-production server; and
   store the masked value on the non-production server.

8. The computer program product of claim 7, wherein the obfuscating step comprises masking the data value using a segmented mapping technique.

9. The computer program product of claim 7, wherein the secure lookup table is stored on the non-production server.

10. The computer program product of claim 7, further operable to cause the data processing apparatus to generate a report of the obfuscation step.

11. The computer program product of claim 7, further operable to cause the data processing apparatus to email a user the status of the obfuscating step.

12. The computer program product of claim 7, further operable to cause the data processing apparatus to present a plurality of obfuscation techniques to the user and base the obfuscating step on a selection made by the user.

13. A system for securing data used by a production server, the system comprising:
   a target environment comprising a target database and a target application server, the target application server configured to store a masked value received from the production server; and a production environment comprising a production database and the production server, the production server comprising a processor and a memory and configured to:
read a data value on the production server;
obfuscate the data value in the memory of the production server by generating via a non-reversible process an index into a secure lookup table based on the data value and retrieving a secure lookup table value at the index in the secure lookup table to create a masked value; and
transmit the masked value to the target application server.

14. The system of claim 13, wherein the production server is configured to obfuscate the data value using a segmented mapping technique.

15. The system of claim 13, wherein the secure lookup table is stored on the target application server.

16. The system of claim 13, wherein the production server is configured to generate a report of the obfuscation step.

17. The system of claim 13, wherein the production server is configured to email a user the status of obfuscating the data value.

18. The system of claim 13, wherein the production server is further operable to present a plurality of obfuscation techniques to a user and base the obfuscating operation on a selection made by the user.

* * * * *